US012611575B1

(12) United States Patent
Villanueva

(10) Patent No.: US 12,611,575 B1
(45) Date of Patent: Apr. 28, 2026

(54) GOLF BALL LINE MARKER TOOL

(71) Applicant: Edward Jack Evans Villanueva, Union City, CA (US)

(72) Inventor: Edward Jack Evans Villanueva, Union City, CA (US)

( * ) Notice: Subject to any disclaimer, the term of this patent is extended or adjusted under 35 U.S.C. 154(b) by 0 days.

(21) Appl. No.: 19/311,890

(22) Filed: Aug. 27, 2025

Related U.S. Application Data

(60) Provisional application No. 63/837,659, filed on Jul. 2, 2025.

(51) Int. Cl.
*B41F 17/30* (2006.01)
*A63B 45/02* (2006.01)
*A63B 102/32* (2015.01)

(52) U.S. Cl.
CPC .............. *A63B 45/02* (2013.01); *B41F 17/30* (2013.01); *A63B 2102/32* (2015.10)

(58) Field of Classification Search
CPC ......... A63B 45/02; A63B 57/20; B41F 17/30; B41F 17/34
USPC ............................ 101/35, DIG. 40; D21/789
See application file for complete search history.

(56) References Cited

U.S. PATENT DOCUMENTS 6,453,807 B1 * 9/2002 Ramey .............. A63B 69/3688 101/DIG. 40

FOREIGN PATENT DOCUMENTS

| | | | | |
|---|---|---|---|---|
| KR | 20200107190 A | * | 9/2020 | A63B 45/02 |
| KR | 20220092319 A | * | 7/2022 | A63B 45/02 |
| KR | 20220002881 U | * | 12/2022 | A63B 45/02 |
| KR | 20240029403 A | * | 3/2024 | A63B 45/02 |

OTHER PUBLICATIONS

English translation of KR 20200107190 A to Jeong, publication date Sep. 16, 2020. (Year: 2020).*
English translation of KR 20220002881 U, publication date Dec. 7, 2022. (Year: 2022).*
English translation of KR 20220092319 A to Park, publication date Jul. 1, 2022. (Year: 2022).*
English translation of KR 20240029403 A to Kang et al., publication date Mar. 5, 2024. (Year: 2024).*

* cited by examiner

*Primary Examiner* — Leslie J Thompson
(74) *Attorney, Agent, or Firm* — Cognition IP, P.C.; Edward Steakley

(57) ABSTRACT

A golf ball line marking tool having a body with a circular opening configured to receive a golf ball. A channel is disposed in the body with an opening in a longitudinal channel. A golf ball is inserted into the body where the golf ball is seated into an inner portion of the body. Once the golf ball is seated into the body, a portion of the mid-center line of the golf ball is positioned under the opening of the longitudinal channel. A marker then may be used to draw a straight line onto the golf ball by moving the tip of the maker via the longitudinal channel.

26 Claims, 6 Drawing Sheets

SECTION A-A

GOLF BALL LINE MARKER TOOL

CROSS-REFERENCE TO RELATED APPLICATIONS

This non-provisional application claims priority to and incorporates by reference, in its entirety, U.S. provisional application 63/837,659, titled GOLF BALL LINE MARKER TOOL, filed on Jul. 2, 2025.

FIELD

The application relates generally to the field of training equipment, and more specifically to a golf ball line marker tool.

SUMMARY

An inventive golf ball line marking tool is described herein. In some embodiments, a golf ball line marking tool has a body with a circular opening configured to receive a golf ball. A channel is disposed in the body, with the channel having a longitudinal channel. A golf ball is inserted into the body where the golf ball is seated into an inner portion of the body. Once the golf ball is seated into the body, a portion of the mid-center line of the golf ball is positioned under the opening of the longitudinal channel. A marker then may be used to draw a straight line onto the golf ball by moving the tip of the maker via the longitudinal channel. Also, the marker may be used to draw a line on either side of the golf ball maker tool to create a center line and a first parallel line to the left of the center line, and a right parallel line to the right of the drawn center line.

In some embodiments, the golf ball line marker tool a made from single steel billet and features a circular design that incorporates a stencil on the outer ring. A golf ball is inserted through a designated side of the ring and is securely press-fitted. This innovative design ensures that the stencil line is self-centering, providing consistent results. In some embodiments, the dimensions of the golf ball line marker tool are 52 mm in diameter and 11 mm in width, with a stencil opening measuring 2.5 mm.

Furthermore, the appended claims may serve as a summary of this application.

DETAILED DESCRIPTION OF THE DRAWINGS

Figure 1:
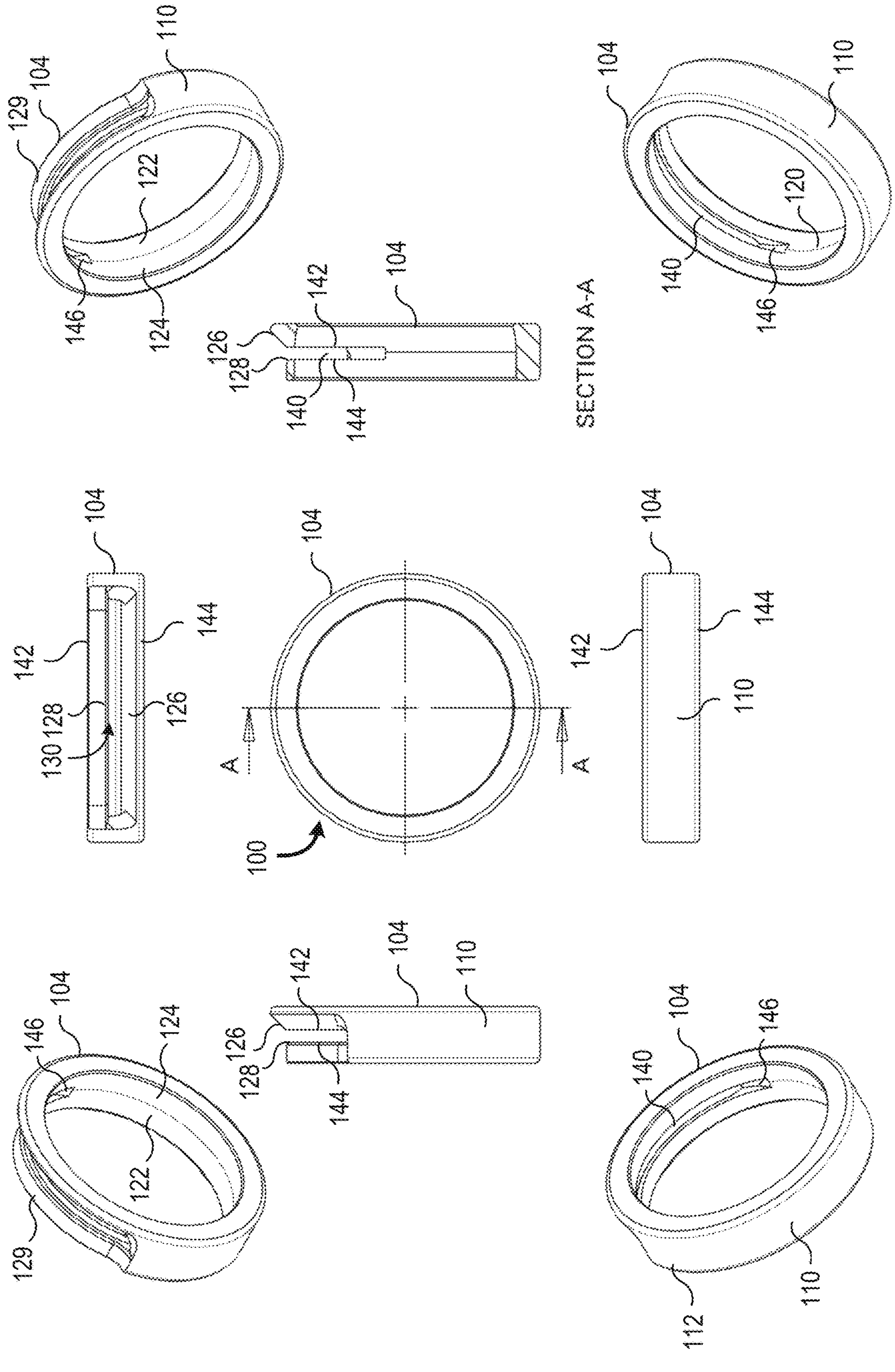
FIGS. 1A-1I are diagrams illustrating an example of the golf ball line marker tool according to some embodiments.
Figure 1A:
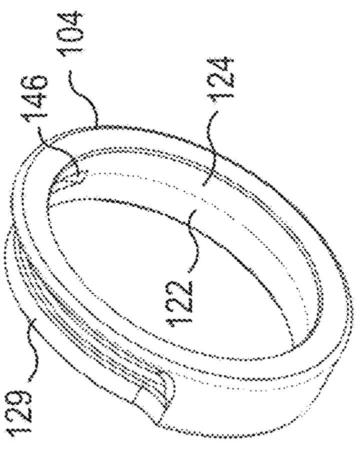
Figure 1B:
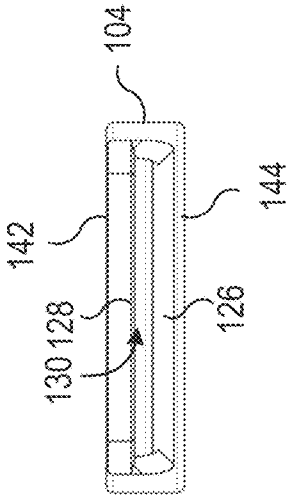
Figure 1C:
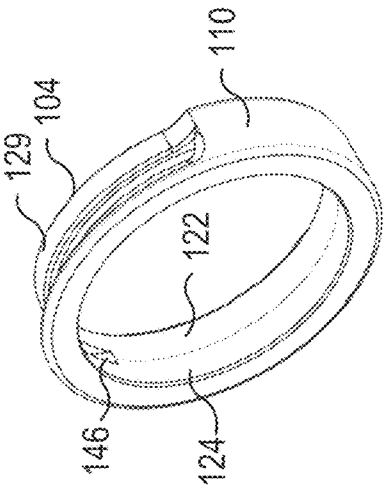
Figure 1D:
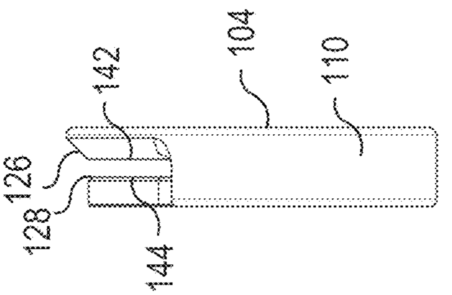
Figure 1E:
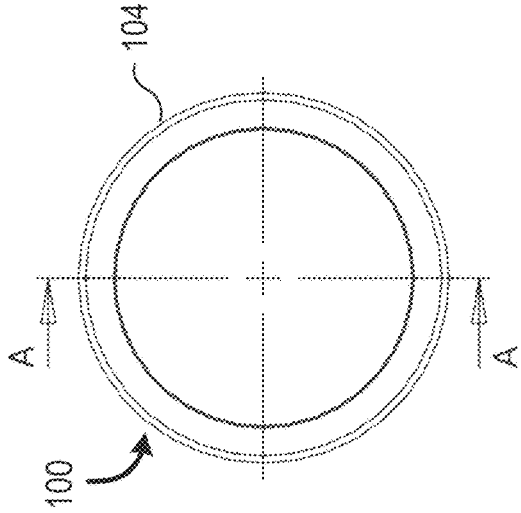
Figure 1F:
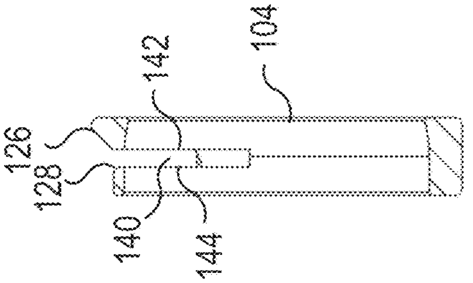
Figure 1I:
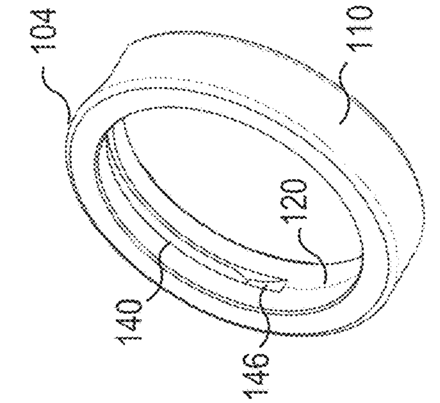
Figure 1H:
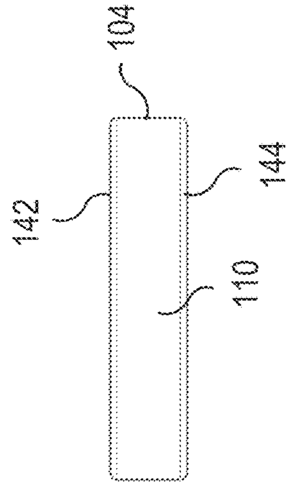
Figure 1G:
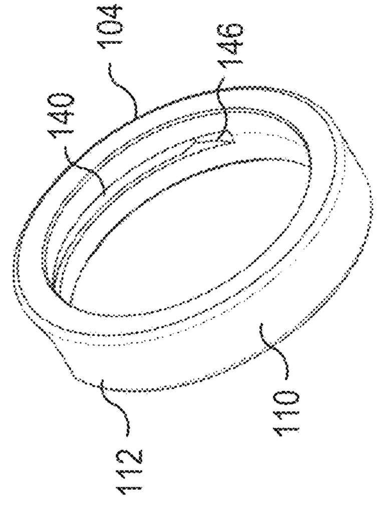

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially.

In some embodiments, the golf ball line marker tool may include the following components. They are labeled with a reference number corresponding to the component as illustrated in one or more FIGS. 1-4B.

GOLF BALL LINE MARKER TOOL INDEX

100—Golf ball line marking apparatus
104—Body
106—First opening
108—Second opening
110—Outer surface
112—Outer circumference portion
120—Interior surface (wall)
122—First inner circumference portion
124—Second inner circumference portion
130—Channel
126—First beveled surface
128—Second beveled surface
129—Recessed portion
140—Longitudinal opening
142—First lateral side
144—Second lateral side
146—First distal end
148—Second distal end
150—Line marker FIGS. 1A-1I are diagrams illustrating an example of the golf ball line marker tool according to some embodiments. FIGS. 1A-1I illustrates different perspectives of the golf ball line marking tool 100 including across-sectional view of the global line marker tool 100 at cross-section A-A.

Figure 2B:
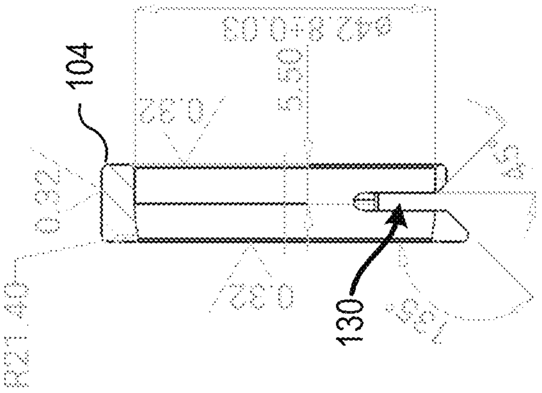
FIGS. 2A-2C are diagrams illustrating an example of the golf ball line marker tool according to some embodiments.
Figure 2A:
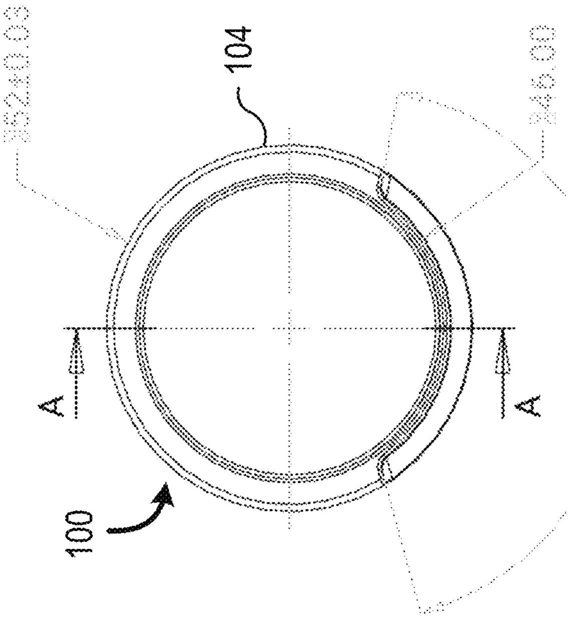
Figure 2C:
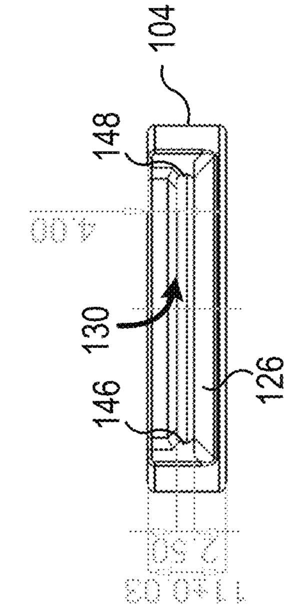
Figure 3A:
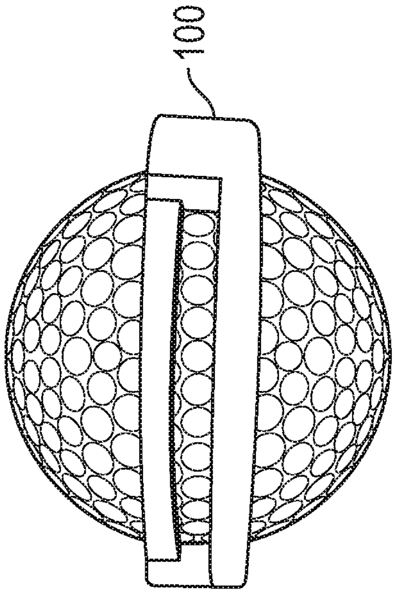
FIGS. 3A-3D are diagrams illustrating a golf ball inserted into an embodiment of the golf ball line marker tool 100.
Figure 3B:
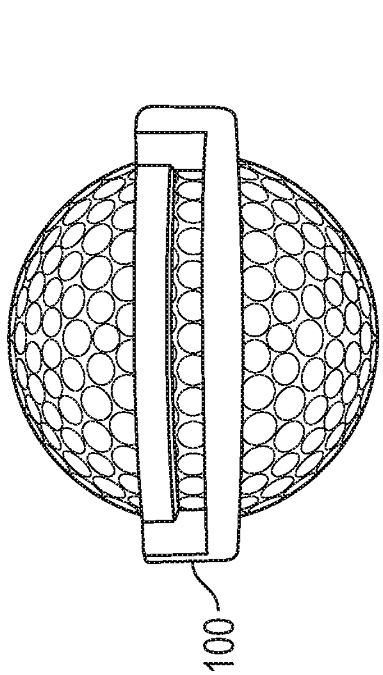
Figure 3C:
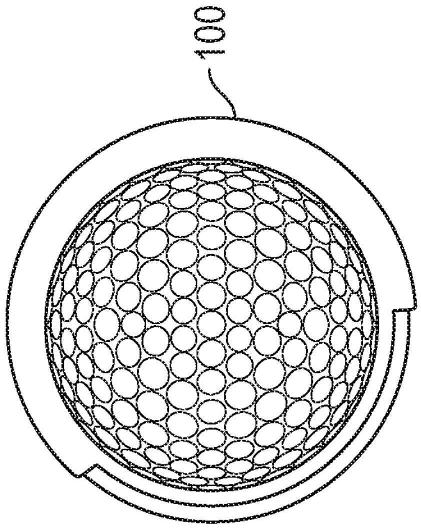
Figure 3D:
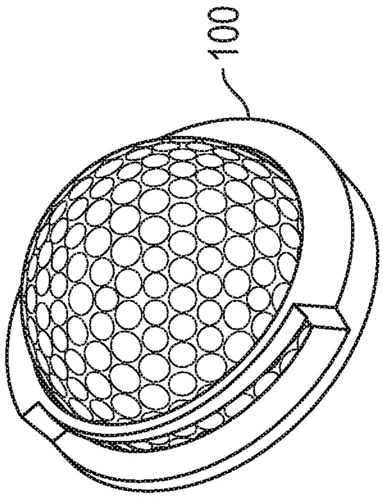

FIGS. 2A-2C are diagrams illustrating an example of the golf ball line marker tool 100 according to some embodiments. FIG. 2A is a side view of the golf ball line marker tool. FIG. 2B illustrates a cross-sectional view of FIG. 2A at cross-section A-A. FIGS. 2A-2C illustrate dimensions of the golf ball line marker tool 100 according to some embodiments.

FIGS. 3A-3D are diagrams illustrating a golf ball inserted into an embodiment of the golf ball line marker tool 100.

Figure 4B:
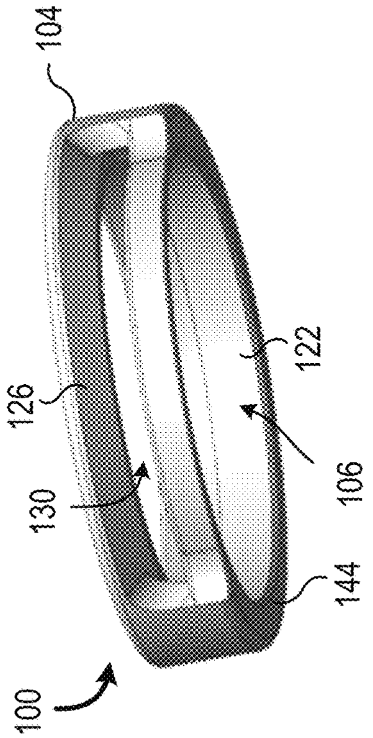
FIGS. 4A-4C are diagrams illustrating an embodiment of the golf ball line marker tool illustrated in 3-dimensions.
Figure 4A:
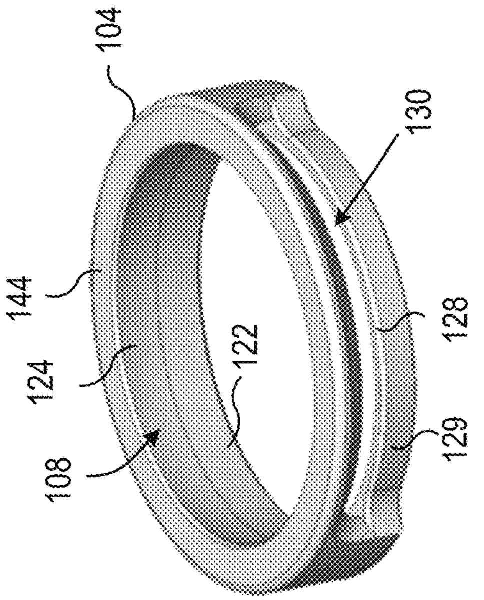
Figure 4C:
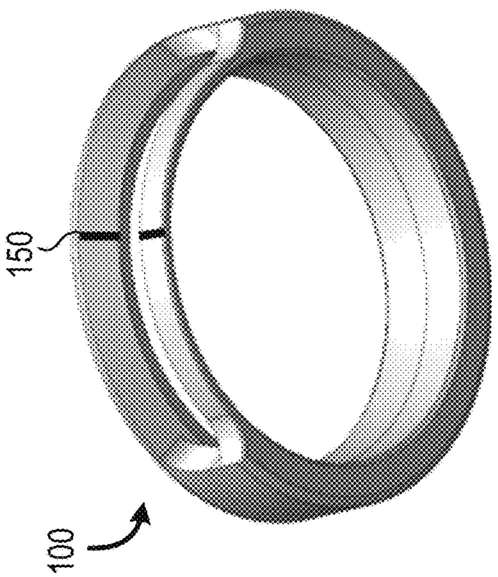

FIGS. 4A-4B are diagrams illustrating an embodiment of the golf ball line marker tool illustrated in 3-dimensions.

In some embodiments, a golf ball marking apparatus 100 includes a body 104 that receives a golf ball. The body 104 has an outer surface 110 and an interior surface 120. In some embodiments, the body 104 is designed to receive a golf ball from one side of the body 104. The golf ball can be inserted and seated into the body 104. In some embodiments, a golf may be received via the first opening 106. In other embodiments, a golf ball may be received via the second opening 108.

When inserted into the body 104, a center portion (e.g., a hemisphere portion) of the golf ball is positioned at the longitudinal opening 140 of the body 104. A person uses a marking device (such as a soft tipped marker) to draw a line onto the golf ball. The longitudinal opening 140 serves as a linear guide aiding the person in drawing a line onto a center line of the golf ball.

In some embodiments, the body 104 is a circular shaped body that has an outer circumference surface portion 112 that has a substantially uniform arcuate surface. In some embodiments, the outer surface portion 112 is shaped as a square, triangle, rectangle or some other shape. In some embodiments, the outer circumference portion extends around an outer circumference of the body from one end of the channel 130 to another end of the channel 130. In some embodiments, the outer circumference portion has a substantially uniform arcuate surface. Text, graphical designs or logos may be added to the outer circumference portion, for example via embossing, engraving, etching printing upon, etc.

In some embodiments, the interior surface 120 is a wall that has a first inner circumference portion 122 with a substantially uniform arcuate surface. In some embodiments, the interior surface 120 has a second inner circumference portion 124 with a substantially uniform arcuate surface.

The second inner circumference portion 124 has a smaller circumference than the first inner circumference portion 122. The second inner circumference portion 124 has a smaller sized circumference than a circumference of a golf ball inserted into the body 104 (in the opening 106 from the side of the first inner circumference portion 122), which prevents the inserted golf ball from exiting through the body 104. In some embodiments, the second inner circumference portion 124 serves as a ball stop for a golf ball inserted into the body, where the golf ball is stopped at a position within the body 104 such that the center of the golf ball is positioned with the longitudinal opening 140. In some embodiments, the second inner circumference portion is circular and has a radius less than 21.335 mm (i.e., 0.84 inches). In some embodiments, the second inner circumference portion 124 has a curvature the same as a portion of a golf ball. In other words, the second inner circumference portion is shaped with the same spherical curvature a portion of a golf ball such that when the golf ball is seated into the second inner circumference portion 124, the golf ball is press fitted into the body where the spherical center line of the inserted golf ball is positioned under the longitudinal opening 140.

In some embodiments, the inner circumference wall 120 extends around an inner circumference of the body from one end of the channel 130 to another end of the channel 130. Text, graphical designs or logos may be added to the inner circumference portion, for example via embossing, engraving, etching printing upon, etc.

In some embodiments, the longitudinal opening 140 is formed by a first lateral side 142, a second lateral side 144, a first distal end 146 and a second distal end 148. The first lateral side 142 is joined at the first distal end 146 and at the second distal end 148. The second later side 144 is joined at the first distal end 146 and the second distal end 148. In some embodiments, both the first lateral side 142 and the second lateral side 144 have a uniform width between them. In some embodiments, the longitudinal opening has a width ranging from about 2 mm to 3 mm as measured from the first lateral side to the second lateral side.

In some embodiments, the interior surface 120 of the body 104 is a wall that forms a first opening 106 on a first side of the body and forming a second opening 108 on a second side of the body. The wall fully encircles or surrounds an interior space of the body 104. The first opening 106 is sized to receive a golf ball. In some embodiments the first opening is circular and has a radius greater than or equal to 21.335 mm (i.e., 0.84 inches). In some embodiments, the first opening is a circular and has a radius than or equal to 22.225 mm (i.e., 0.875 inches). In some embodiments, the interior surface 120 of the body 104 is an interior wall that has an inner circumference portion with a substantially uniform arcuate surface.

In some embodiments, a channel 130 is disposed in the outer portion of the body 104. The channel 130 includes the longitudinal opening 140. In some embodiments, the channel 130 has a first beveled surface 126 extending from an edge portion of the outer circumference portion to an edge of the first lateral side. In some embodiments, the body 104 has a symmetrical design with the beveled surface 126 on each side of the longitudinal opening.

In some embodiments, the outer circumference has a recessed portion 129 on one side of the channel 130. The recessed portion 129 has a substantially uniform arcuate surface. The recessed portion 129 is thinner than the non-recessed portion of the body. In other words, the radius from a center point for the surface of the recessed portion has a smaller radius, than the non-recessed portions of the body 104. In some embodiments, each end of the recessed portion 129 has a distal end that is curved and connects one end of the recessed portion to the non-recessed outer circumference portion.

It will be appreciated that the present disclosure may include any one and up to all of the following examples.

Example 1: A golf ball marking apparatus comprising: a solid body, comprising: a first inner circumference portion forming a first opening through a first side of the body and a second inner circumference portion forming a second opening on a second opposite side of the body, the first opening sized to receive a golf ball into the body, a channel disposed in an outer circumference portion of the body, the channel comprising: a first beveled surface; a first lateral side; a second lateral side; a first distal end; and a second distal end, wherein the first lateral side, the second lateral side, the first distal end and the second distal end form a longitudinal opening disposed through the body; wherein the second inner circumference portion is shaped to mate against a golf ball that is inserted into the first opening, such that the golf ball is seated into the body and is prevented from passing through the body, and such that a center portion of the golf ball when seated in the body is positioned under the longitudinal opening.

Example 2. The golf ball marking apparatus of Example 1, wherein the first inner circumference portion comprises an arcuate surface that surrounds the golf ball when the golf ball is seated in the body.

Example 3. The golf ball marking apparatus of any one of Examples 1-2, wherein the arcuate surface has a first uniform radius from a center point of the body to the first inner circumference portion.

Example 4. The golf ball marking apparatus of any one of Examples 1-3, wherein the first radius is a radius greater than 21.335 mm (0.84 inches).

Example 5. The golf ball marking apparatus any one of Examples 1-4, wherein the first radius is a radius less than 22.225 mm (0.875 inches).

Example 6. The golf ball marking apparatus of any one of Examples 1-5, wherein the second inner circumference portion has a radius that is smaller than the first radius.

Example 7. The golf ball marking apparatus of any one of Examples 1-6, wherein the second inner circumference portion has a surface that is such that the golf ball inserted into the first opening is seated within the body and is prevented from exiting through the second opening.

Example 8. The golf ball marking apparatus of any one of Examples 1-7, wherein the first lateral side and the second lateral side each have a substantially planar surface, wherein the first lateral side connects to the first distal end and the second distal end, and wherein the second later side connects to the first distal end and the second distal end.

Example 9. The golf ball marking apparatus of any one of Examples 1-8, further comprising a line marker indicator, the line marker indicator being perpendicular to the first lateral side and/or the second lateral side.

Example 10. The golf ball marking apparatus of any one of Examples 1-9, wherein the first beveled surface extends from an edge portion of the outer circumference portion to an edge of the first lateral side.

Example 11. The golf ball marking apparatus of any one of Examples 1-10, wherein the first beveled surface has a flat surface ranging from 150 degrees and 115 degrees relative to an outer surface of the body.

Example 12. The golf ball marking apparatus of any one of Examples 1-11, wherein the first distal end and the second distal are positioned from each other from about 145 degrees to 180 degrees about the body.

Example 13. The golf ball marking apparatus of any one of Examples 1-12, wherein the body comprises a recessed portion extending along the outer circumference portion.

Example 14. The golf ball marking apparatus of any one of Examples 1-13, wherein the channel comprises a second beveled surface extending from an edge of the recessed portion to an edge of the second lateral side.

Example 15. The golf ball marking apparatus of any one of Examples 1-14, wherein the first beveled surface has a flat surface ranging from 150 degrees and 115 degrees relative to the outer circumference surface.

Example 16. The golf ball marking apparatus of any one of Examples 1-15, wherein the longitudinal opening has a width ranging from about 2 mm to 3 mm as measured from the first lateral side to the second lateral side.

Example 17. The golf ball marking apparatus of any one of Examples 1-16, wherein the recessed portion comprises a radius from a center point of the body which is smaller than a radius from a center point of the body of an outer circumference portion.

Example 18. The golf ball marking apparatus of any one of Examples 1-17, wherein when the golf ball is seated into the body, a portion of the golf ball extends out of the first opening, and a portion of the golf ball extends out of the second opening.

Example 19. A golf ball marking apparatus comprising: a circular shaped body comprising: a first circular opening on a first side of the circular shaped body, the first circular opening shaped to receive a golf ball; a second circular opening on a second side of the circular shaped body; and an outer circumference portion having an arcuate surface; an inner circumference portion having an arcuate surface, wherein the arcuate surface has a first radius from a center point of the circular shaped body to the first inner circumference portion; and a channel forming a longitudinal opening in the body, wherein the channel comprises: a first lateral side; a second lateral side; a first distal end; and a second distal end, wherein a first portion of the first lateral side joins the first distal end and a second portion of the first lateral side joins the second distal end, and a first portion of the second lateral side joins the first distal end, and a second portion of the second lateral side joins the second distal end; wherein the second inner circumference portion is shaped to mate against a golf ball that is inserted into the first opening, such that the golf ball is seated into the body and is prevented from passing through the body, and such that a center portion of the golf ball when seated in the body is positioned under the longitudinal opening; and wherein when the golf ball is seated into the body, a portion of the golf ball extends out of the first opening, and a portion of the golf ball extends out of the second opening.

Example 20. The golf ball marking apparatus of Example 19, wherein the first radius is a radius greater than 21.335 mm (0.84 inches).

Example 21. The golf ball marking apparatus of any one of Examples 19-20, wherein the first radius is a radius less than 22.225 mm (0.875 inches).

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A golf ball marking apparatus comprising:

a solid body, comprising:

a first inner circumference portion comprising a circular wall forming a first opening through a first side of the body and a second inner circumference portion forming a second opening on a second opposite side of the body, the first opening sized to receive a golf ball into the body, wherein the circular wall fully surrounds the first opening, a channel disposed in an outer circumference portion of the body, the channel comprising:

a first beveled surface;

a first lateral side;

a second lateral side;

a first distal end; and a second distal end, wherein the first lateral side, the second lateral side, the first distal end and the second distal end form and fully surround a longitudinal opening disposed through the body;

wherein the first inner circumference portion has a circular surface with a uniform circumference that extends from the first opening to the longitudinal opening;

wherein the second inner circumference portion has a spherically curved surface that extends from the longitudinal opening to the second opening, wherein a circumference of the spherically curved surface is wider at the longitudinal opening relative to a circumference of the spherically curved surface at the second opening, and wherein the circumference of the spherically curved surface at the second opening is smaller than the uniform circumference of the circular surface; and wherein the second inner circumference portion is shaped to mate against a golf ball that is inserted into the first opening, such that the golf ball is press fit and seated into the body and is prevented from passing through the body, and such that a center portion of the golf ball when press fit and seated in the body is positioned under the longitudinal opening.

2. The golf ball marking apparatus of claim 1, wherein the first inner circumference portion comprises an arcuate surface that fully surrounds the golf ball when the golf ball is seated in the body.

3. The golf ball marking apparatus of claim 2, wherein the arcuate surface has a first uniform radius from a center point of the body to the first inner circumference portion.

4. The golf ball marking apparatus of claim 1, wherein the outer circumference portion has a recessed portion and a non-recessed portion on a side of the channel, the recessed portion having a substantially uniform arcuate surface, wherein a surface of the recessed portion has a smaller radius than a surface of the non-recessed portion.

5. The golf ball marking apparatus of claim 4, wherein the recessed portion has a first distal end and a second distal end that are each curved and connect to a non-recessed outer circumference portion.

6. The golf ball marking apparatus of claim 4, wherein the first lateral side has a flat surface extending from an edge of the inner circumference portion to an edge of the outer circumference portion.

7. The golf ball marking apparatus of claim 4, wherein the second inner circumference portion has a surface that is such that the golf ball inserted into the first opening is seated within the body and is prevented from exiting through the second opening.

8. The golf ball marking apparatus of claim 4, further comprising a line marker indicator, the line marker indicator being perpendicular to the first lateral side and/or the second lateral side, the line marker indicator positioned on a surface of the recessed portion.

9. The golf ball marking apparatus of claim 1, wherein the first lateral side and the second lateral side each have a substantially planar surface, wherein the first lateral side connects to the first distal end and the second distal end, and wherein the second lateral side connects to the first distal end and the second distal end.

10. The golf ball marking apparatus of claim 1, wherein the first beveled surface extends from an edge portion of the outer circumference portion to an edge of the first lateral side.

11. The golf ball marking apparatus of claim 1, wherein the flat surface ranging from 150 degrees and 115 degrees relative to an outer surface of the body, wherein the flat surface extends from the first distal end to the second distal end.

12. The golf ball marking apparatus of claim 11, wherein the first beveled surface has a flat surface ranging from 150 degrees and 115 degrees relative to the outer circumference surface.

13. The golf ball marking apparatus of claim 1, wherein the first distal end and the second distal end are positioned from each other from about 145 degrees to 180 degrees about the body.

14. The golf ball marking apparatus of claim 1, wherein the body comprises a recessed portion extending along the outer circumference portion, the recessed portion having a substantially uniform arcuate surface, and the body comprises a non-recessed portion, wherein the recessed portion of the body is thinner than the non-recessed portion of the body.

15. The golf ball marking apparatus of claim 14, wherein the channel comprises a second beveled surface extending from an edge of the recessed portion to an edge of the second lateral side.

16. The golf ball marking apparatus of claim 14, wherein the recessed portion comprises a radius from a center point of the body which is smaller than a radius from a center point of the body of an outer circumference portion.

17. The golf ball marking apparatus of claim 11, wherein when the golf ball is seated into the body, a portion of the golf ball extends out of the first opening, and a portion of the golf ball extends out of the second opening, wherein each portion is a greater portion of the golf ball than a portion of the golf ball that is seated into the body.

18. The golf ball marking apparatus of claim 1, wherein the longitudinal opening has a width ranging from about 2 mm to 3 mm as measured from the first lateral side to the second lateral side.

19. The golf ball marking apparatus of claim 1, wherein the second inner circumference portion is shaped with a same spherical curvature of a portion of the golf ball such that when the golf ball is seated into the second inner circumference portion, the golf ball is press fitted into the body such that a spherical center line of the golf ball is positioned under the longitudinal opening.

20. A golf ball marking apparatus comprising:
a circular shaped body comprising:
a first circular opening on a first side of the circular shaped body, the first circular opening shaped to receive a golf ball;
a second circular opening on a second side of the circular shaped body;
a first inner circumference portion having an arcuate surface, wherein the arcuate surface has a first radius from a center point of the circular shaped body to the first inner circumference portion, the first inner circumference portion comprising a wall that fully surrounds the first circular opening; a second inner circumference portion;
a channel forming a longitudinal opening in the body, the longitudinal opening being separate from the first circular opening and second circular opening, wherein the channel comprises:
a first lateral side;
a second lateral side;
a first distal end; and
a second distal end, wherein a first portion of the first lateral side joins the first distal end and a second portion of the first lateral side joins the second distal end, and a first portion of the second lateral side joins the first distal end, and a second portion of the second lateral side joins the second distal end; an outer circumference portion having an arcuate surface, wherein the outer circumference portion has a recessed portion and a non-recessed portion on a side of the channel, the recessed portion having a substantially uniform arcuate surface, wherein the substantially uniform arcuate surface of the recessed portion has a smaller radius than a surface of the non-recessed portion, and wherein the recessed portion of the body is thinner than the non-recessed portion of the body; and
wherein the second inner circumference portion is shaped to mate against the golf ball that is inserted into the first circular opening, such that the golf ball is seated into the body and is prevented from passing through the body, and such that a center portion of the golf ball when seated in the body is positioned under the longitudinal opening; and wherein when the golf ball is seated into the body, a portion of the golf ball extends out of the first circular opening, and a portion of the golf ball extends out of the second circular opening.

21. The golf ball marking apparatus of claim 20, wherein the first lateral side has a flat surface extending from an inner circumference edge to an outer circumference edge.

22. The golf ball marking apparatus of claim 20, wherein the first inner circumference portion has a circular surface with a uniform circumference that extends from the first circular opening to the longitudinal opening, and wherein the second inner circumference portion has a spherically curved surface that extends from the longitudinal opening to the second circular opening.

23. The golf ball marking apparatus of claim 22, wherein a circumference of the spherically curved surface is wider at the longitudinal opening relative to a circumference of the spherically curved surface at the second opening.

24. The golf ball marking apparatus of claim 23, wherein the circumference of the spherically curved surface at the second opening is smaller than the uniform circumference of the circular surface.

25. The golf ball marking apparatus of claim 20, wherein the arcuate surface of the outer circumference portion is substantially uniform, and wherein the outer circumference surface portion extends around an outer circumference of the circular shaped body from one end of the channel to another end of the channel.

26. The golf ball marking apparatus of claim 20, wherein the second inner circumference portion is shaped with a same spherical curvature of a portion of the golf ball such that when the golf ball is seated into the second inner circumference portion, the golf ball is press fitted into the body such that a spherical center line of the golf ball is positioned under the longitudinal opening.

* * * * *